United States Patent
Chiao et al.

(10) Patent No.: US 6,904,493 B2
(45) Date of Patent: Jun. 7, 2005

(54) SECURE FLASH MEMORY DEVICE AND METHOD OF OPERATION

(75) Inventors: Mong-Ling Chiao, Taipei (TW); Chih-Jen Tsai, Taipei (TW)

(73) Assignee: AniMeta Systems, Inc., Taipei (TW)

( * ) Notice: Subject to any disclaimer, the term of this patent is extended or adjusted under 35 U.S.C. 154(b) by 202 days.

(21) Appl. No.: 10/064,414

(22) Filed: Jul. 11, 2002

(65) Prior Publication Data

US 2004/0010656 A1 Jan. 15, 2004

(51) Int. Cl.$^7$ ............................................. G06F 12/00
(52) U.S. Cl. ................... 711/103; 711/115; 711/164; 713/193; 710/302
(58) Field of Search .................. 711/115, 103, 711/163–164, 111; 710/301–302, 13, 62–63; 365/185.33; 713/202, 200, 182–183, 191, 193

(56) References Cited

U.S. PATENT DOCUMENTS

| | | | |
|---|---|---|---|
| 5,835,594 A | | 11/1998 | Albrecht et al. |
| 5,892,905 A | * | 4/1999 | Brandt et al. ............... 713/201 |
| 6,012,145 A | * | 1/2000 | Mathers et al. ............. 713/202 |
| 6,321,335 B1 | * | 11/2001 | Chu ........................... 713/200 |
| 6,324,537 B1 | | 11/2001 | Moran |
| 6,385,667 B1 | * | 5/2002 | Estakhri et al. ................ 710/8 |
| 6,804,752 B2 | * | 10/2004 | Patterson et al. ........... 711/163 |
| 2002/0010827 A1 | * | 1/2002 | Cheng ........................ 711/103 |
| 2002/0162009 A1 | * | 10/2002 | Shmueli et al. ............. 713/200 |
| 2003/0005337 A1 | * | 1/2003 | Poo et al. .................... 713/202 |
| 2003/0023871 A1 | * | 1/2003 | Gnanasabapathy et al. . 713/200 |
| 2003/0074577 A1 | * | 4/2003 | Bean et al. .................. 713/200 |
| 2003/0159056 A1 | * | 8/2003 | Cromer et al. .............. 713/193 |
| 2004/0042363 A1 | * | 3/2004 | Kobayashi et al. ...... 369/53.21 |
| 2004/0103288 A1 | * | 5/2004 | Ziv et al. ..................... 713/185 |

OTHER PUBLICATIONS

Disgo, "Using Multilingual KeySafe™," http://www.mydisgo.com/downloads/getfile.php?name=multilingual_keysafe.pdf, Dec. 11, 2001, pp. 1–13.*

Disgo, "CMS Peripherals Ltd Introduces Exclusive Security Application for disgo," http://www.mydisgo.com/press/press/_releases/article_3.php, Dec. 11, 2001.*

* cited by examiner

*Primary Examiner*—Matthew Anderson
*Assistant Examiner*—Shane Thomas
(74) *Attorney, Agent, or Firm*—Winston Hsu

(57) ABSTRACT

A secure flash memory device includes a connection port, a microcontroller, a flash memory, and a security program. The security program provides pass code security between a computer connected to the connection port and the flash memory. The microcontroller controls the flow of data between the computer and the flash memory as allowed by the security program. The security program is stored in the flash memory or in the microcontroller and can be executed by the computer, when the microcontroller receives flash memory access requests from the connection port.

22 Claims, 4 Drawing Sheets

SECURE FLASH MEMORY DEVICE AND METHOD OF OPERATION

BACKGROUND OF INVENTION

1. Field of the Invention

The present invention relates to a flash memory storage device for a computer, and more specifically, to a flash memory storage device for a computer that is secured by a security program and a related method for providing security.

2. Description of the Prior Art

Computer storage media technology is evolving rapidly. While hard drives and CD-ROMs will still be around for years to come because of their high capacity and low cost, new forms of storage are constantly being developed. One technology that appears to have distinct advantages over conventional forms of storage is flash memory. Like conventional storage systems, flash memory is nonvolatile, requiring no power to maintain the stored information, and rewriteable, meaning that it can be used repeatedly with no degradation in quality. However, over conventional forms of storage flash memory chips are more reliable, allow for faster access, and can be made small enough to be portable.

The high cost associated with flash memory makes hard drives and CD-ROMs more suitable for large volume storage applications (650 MB to 160+GB). However, for applications requiring storage in the range of 8 MB to 512 MB, flash memory devices do offer several advantages. For instance, a flash memory device of this storage size can be made to be portable. This puts portable flash memory devices in competition with traditional portable storage devices such as 3½" floppy disks and specialized high capacity floppy disks, removable hard drives, and tape drives. In fact, portable flash memory devices have advantages over these devices as well. First, portable flash memory devices do not require a drive device to be installed in a computer, only an access port. Second, flash memory access is comparatively fast and does not require moving parts. Finally, portable flash memory devices are not magnetic media and therefore not susceptible to damage from magnetic fields. Because of this, portable flash memory devices will most likely replace other forms of reusable portable storage.

Currently, there are a large number of portable flash memory devices available. The majority of these devices connect to a computer either through a small reader/writer device connected to a port of the computer, or by directly connecting to a port of the computer, said ports typically being universal serial bus (USB) ports. Additionally, some of these flash memory devices provide data security in the form of password-protected access. However, the data security provided requires software to be separately installed on the computer.

The prior art secure flash memory device requires separately supplied software to be installed on the computer prior to using the secure flash memory device. This software must be separately installed on all computers that a user wishes to use the flash memory device on, causing undue inconvenience to the user. Moreover, the software must be distributed on a CD, floppy disk, or through the Internet resulting in excessive expense for the producer of the flash memory device.

SUMMARY OF INVENTION

It is therefore a primary objective of the claimed invention to provide a flash memory storage device for a computer that is secured by a security program provided in the flash memory storage device.

Briefly summarized, the claimed invention includes a connection port, a microcontroller, a flash memory, and a security program for limiting access to the flash memory. The security program provides pass code security and verification of this pass code determines how data can be exchanged between a computer to which the connection port is connected and the flash memory.

According to the claimed invention, the microcontroller controls the flow of data between the computer and the flash memory based on the pass code verification.

According to the claimed invention, the security program can be stored in the microcontroller or in the flash memory.

According to the claimed invention, the security program can be executed by the computer, when the microcontroller receives flash memory access requests from the connection port.

It is an advantage of the claimed invention that the security program instructs the microcontroller to limit access to the flash memory based on verification of the pass code.

It is an advantage of the claimed invention that the security program is stored in the microcontroller or the flash memory and does not require a separate delivery and installation.

These and other objectives of the claimed invention will no doubt become obvious to those of ordinary skill in the art after reading the following detailed description of the preferred embodiment that is illustrated in the various figures and drawings.

DETAILED DESCRIPTION

The present invention is described in two embodiments. In the preferred embodiment, a security program is stored in a flash memory, and a predetermined pass code is stored in a microcontroller. In a second embodiment, both the security program and the predetermined pass code are stored in the microcontroller. Both of these embodiments illustrate the teachings and accomplish the purpose of the present invention.

Figure 1:
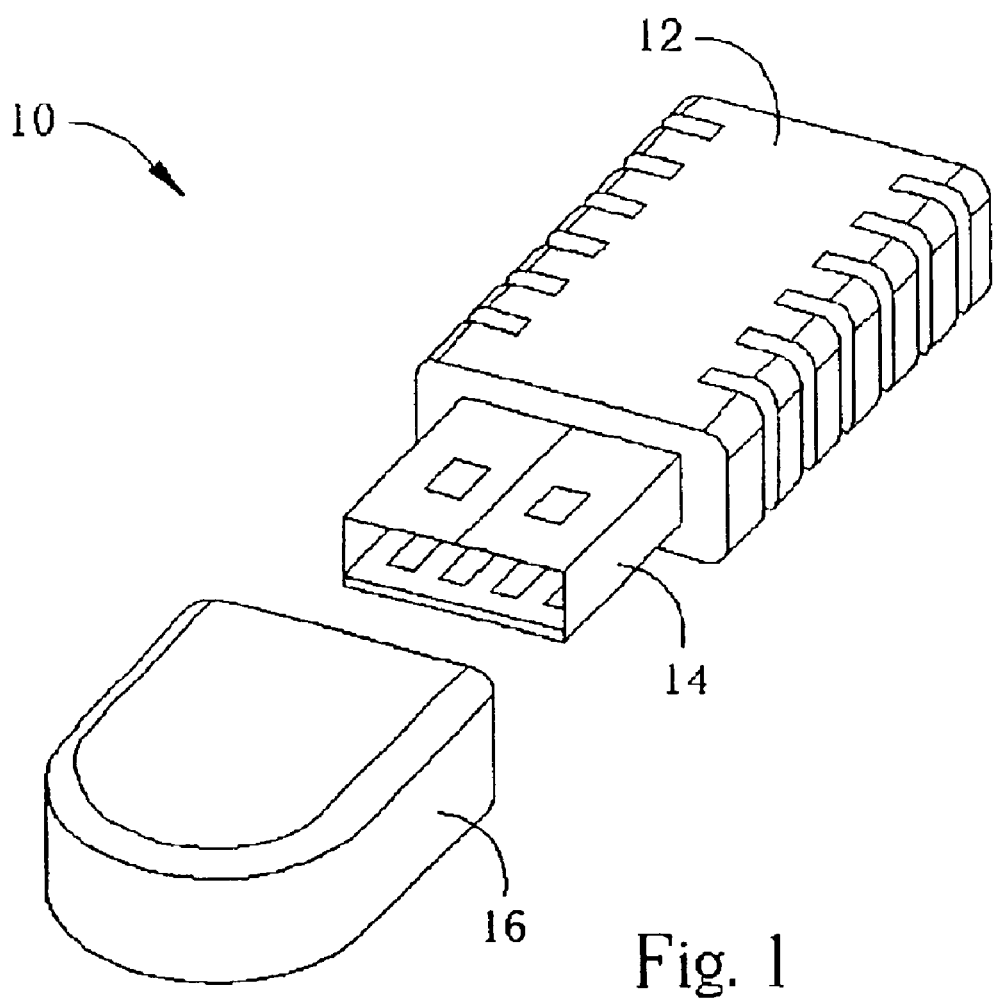
FIG. 1 is a perspective view of a secure flash memory device according to the present invention.

Please refer to FIG. 1, which shows a secure flash memory device 10 according to the present invention. The secure flash memory device 10 comprises a body 12, a connection port 14, and a removable protective cap 16. The connection port 14 is a universal serial bus (USB) port, but could also be an integrated drive electronics (IDE) port or any other typical computer interface port. When the protective cap 16 is removed, the connection port 14 can be connected to a corresponding connection port of a computer (ref. 40, FIG. 2) so that the secure flash memory device 10 can be accessed by the computer 40. The connection port 14 is designed to allow the secure flash memory device 10 to be connected to the computer 40 in a quick and convenient manner. The body 12 contains components that provide functionality to the secure flash memory device 10, and are described in greater detail with reference to FIG. 2.

Figure 2:
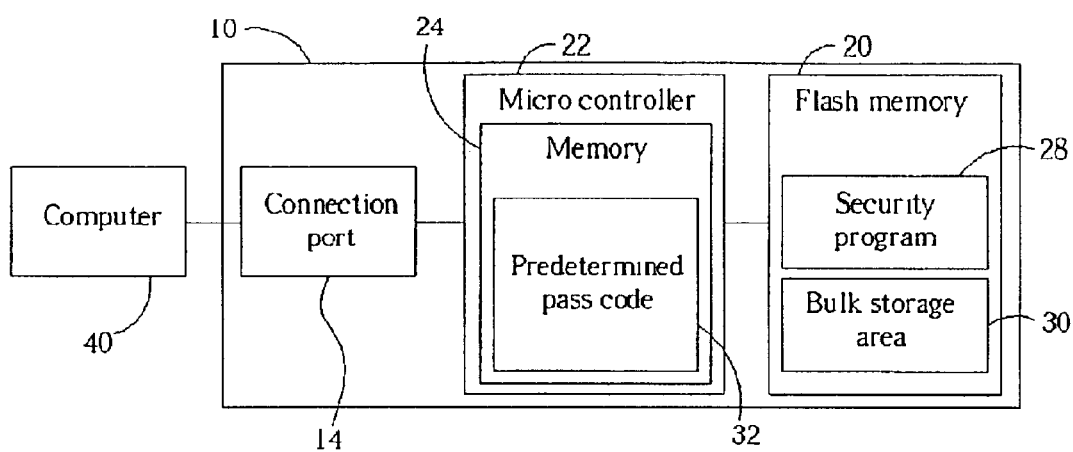
FIG. 2 is a block diagram of the secure flash memory device of FIG. 1 according to the preferred embodiment of the present invention.

Referring to FIG. 2, the secure flash memory device 10 is shown connected to the computer 40 using the connection port 14. The secure flash memory device 10 further comprises a flash memory 20 and a microcontroller 22. The flash memory 20 can be partitioned and is used to store data. The microcontroller 22 includes a small memory 24, which can be a random access memory (RAM) or a read only memory (ROM). The microcontroller 22 also controls the flash memory device 10 by accepting commands and requests from the computer 40 and controlling and regulating access to the flash memory 20 by the computer 40. Specifically, the microcontroller 22 interprets flash memory access requests issued by the computer 40 and controls the flash memory 20 accordingly.

Stored in the flash memory 20 is a security program 28. The security program 28 uses only a small amount of space leaving the remainder of the flash memory 20 available to be used as a bulk storage area 30, in which a user can store any data desired. The security program 28 works in conjunction with a predetermined pass code 32 stored in the memory 24 of the microcontroller 22 to direct the microcontroller 22 to either allow or prevent data to flow between the flash memory 20 and the computer 40 connected to the connection port 14. The predetermined pass code 32 can be encrypted, to further prevent unauthorized access to the flash memory 20. The security program 28 can also include code that allows the predetermined pass code 32 to be modified by a user. Additionally, the security program 28 can control the graphical user interface (GUI) of the computer 40 to provide a user-friendly interface.

When the user wishes to use the secure flash memory device 10, the user simply plugs the connection port 14 into the corresponding connection port of the computer 40. In practical application there are many procedures executed by the computer 40 to ensure a proper connection to the secure flash memory device 10, however, these are well know in the art. After the secure flash memory device 10 is connected to the computer 40 it is ready to be used as storage. However, by default the microcontroller 22 prevents access, for reading or writing, to the bulk storage partition 30 of flash memory 20.

Figure 3:
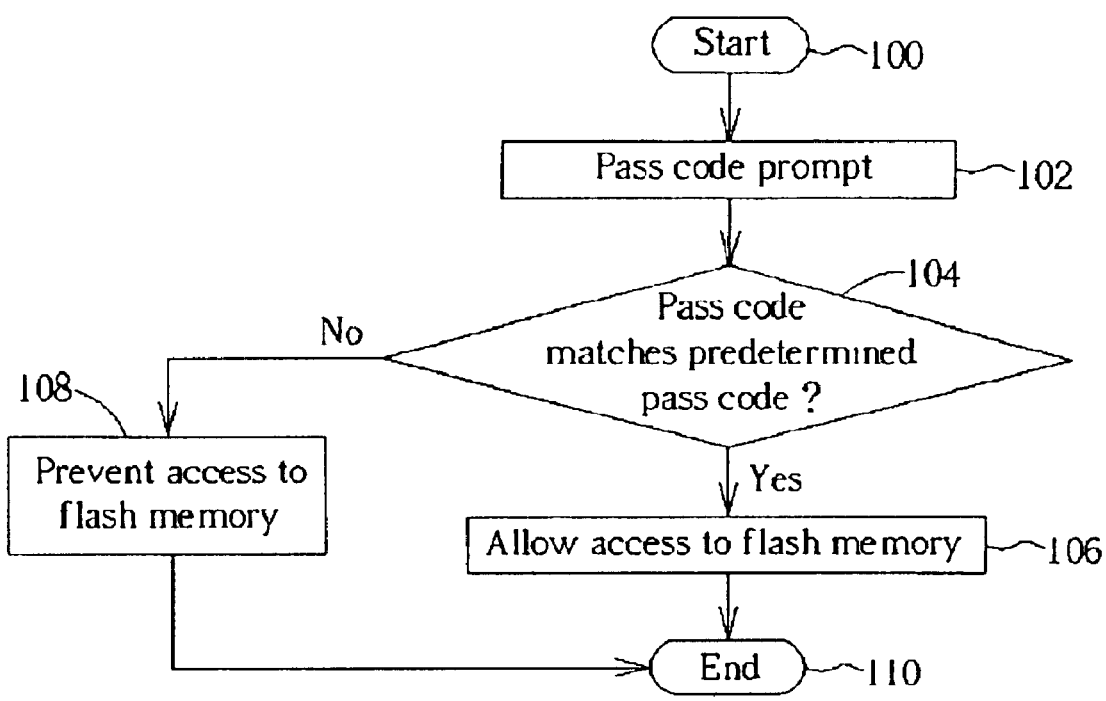
FIG. 3 is a flowchart of an operation of the secure flash memory device shown in FIG. 2.

Referencing FIG. 3, when the user wishes to read data from or write data to the secure flash memory device 10, the following occurs:

Step 100: Start;

Step 102:

Using the computer 40, the user requests read or write access to the flash memory 20. Accordingly, this request is detected by the microcontroller 22, and the microcontroller 22 instructs the computer 40 to execute the security program 28. The security program 28 then prompts the user to enter a pass code;

Step 104:

The pass code entered by the user is compared to the predetermined pass code 32 stored in the memory 24 of the microcontroller 22. Does the entered pass code match the predetermined pass code 32? If they match, go to step 106, if they do not match, go to step 108;

Step 106:

The microcontroller 22 allows access to the flash memory 20 by the computer 40. The user may now read and write information to the bulk storage partition 30 of the flash memory 20;

Step 108:

The microcontroller 22 prevents access to the flash memory 20 by the computer 40. The user may not access the bulk storage partition 30 of the flash memory 20;

Step 110: End.

As described, the security program 28 compares the entered pass code to the predetermined pass code 32. The microcontroller 22 then allows or restrict access to the bulk storage area 30 of the flash memory 20 in accordance with the verification of the entered pass code. The user can request read or write access to the flash memory 20 by executing the security program 28, or performing another similar action. In situations where the verification of the entered pass code fails, the microcontroller 22 blocks read or write access to the flash memory 20. This can be done, for example, by the microcontroller 22 simply ignoring write requests and returning insignificant values or meaningless contents to read requests, without issuing any error messages to the user indicating that read and write operations are unsuccessful.

As mentioned previously, the security program 28 is stored in flash memory 20 and the predetermined pass code 32 is stored in the memory 24 of the microcontroller 22. Storing the security program 28 in the flash memory 20 is done for convenience, but storing the predetermined pass code 32 in the memory 24 of the microcontroller 22 provides added protection since the memory 24 is not normally accessible by a user. Of course, the security program 28 may also be stored in the memory 24 of the microcontroller 22 as in a second embodiment of the present invention.

Figure 4:
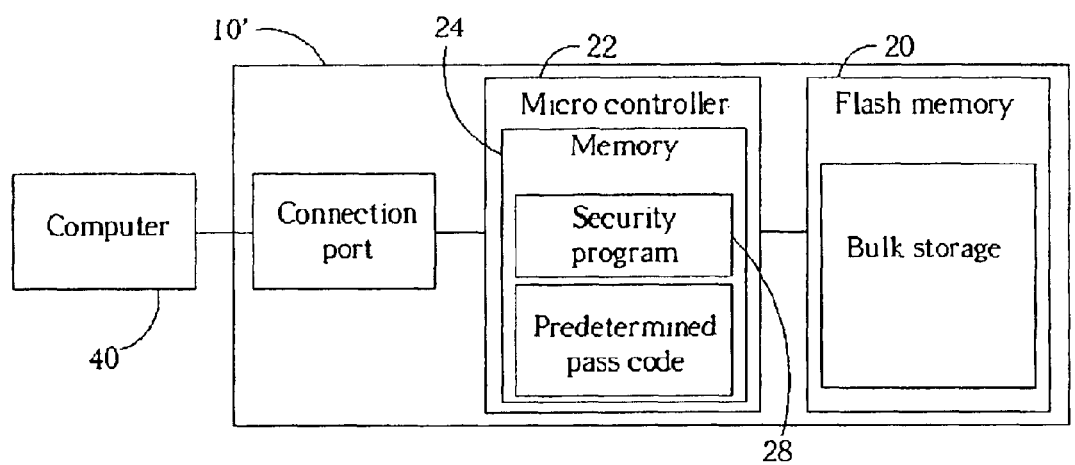
FIG. 4 is a block diagram of the secure flash memory device of FIG. 1 according to a second embodiment of the present invention.

Please refer to FIG. 4 showing a block diagram of the second embodiment of the present invention. A secure flash memory device 10' is connected to the computer 40. The difference between the secure flash memory device 10 and the secure flash memory device 10' is that in the secure flash memory device 10' the security program 28 is stored in the memory 24 of the microcontroller 22. The functional difference of this being that the security program 28 cannot be accidentally overwritten as it may be if stored in the flash memory 20. In operation, the secure flash memory device 10' is substantially identical to the secure flash memory device 10.

In a third embodiment, based on specific design considerations, a portion of the security program 28 can be stored in the memory 24 of the microcontroller 22 and another portion of the security program 28 can be stored in the flash memory 20. This allows the security program 28 to be as large as necessary, and still protects a portion of it from being accidentally overwritten.

The security program 28 may be written in a variety of programming languages. One language that has a particular advantage is hypertext markup language (HTML). HTML is a language that can be understood be a wide array of operating systems such as Microsoft Windows, Mac OS, Unix, and Linux. Writing the security program 28 in HTML allows the flash memory device 10 to be cross-platform. In other words, unique security programs for separate operating systems are not required. Of course, HTML is only one choice of programming language for the security program 28 and other languages acceptable.

Generally, the microcontroller 22 interprets flash memory 20 access requests from the computer 40 and allows or prevents data from being exchanged between the computer 40 and the flash memory 20. The entered pass code is compared to the predetermined pass code 32 by the security program 28. If the entered pass code matches the predetermined pass code 32, the user is allowed to access the bulk storage partition 30 of the flash memory 20. If the entered pass code does not match the predetermined pass code 32, the user is prevented access to the bulk storage partition 30 of the flash memory 20. The security program 28 and the predetermined pass code 32 can be stored wholly or partially in the flash memory 20 or in the memory 24 of the microcontroller 22. Naturally, the present invention can be applied as described so that the flash memory 20 is partitioned such that each partition has different predetermined pass codes for both read and write access.

In contrast to the prior art, the present invention provides a security program that controls how a microcontroller provides access to a flash memory. The flash memory device stores the security program and no separate distribution and install of software is required. The security program when written in HTML can be interpreted by a wide variety of operating systems for which, in the prior art, separate security programs were required. For these reasons, the secure flash memory device according to the present invention is nearly universal, more efficient, and less costly than the prior art.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A secure flash memory device for a computer, the flash memory device comprising:
   a connection port for electrically connecting the flash memory device to the computer;
   a microcontroller electrically connected to the connection port;
   a flash memory electrically connected to the microcontroller; and
   a pre-installed security program for limiting access to the flash memory, a portion of the security program being stored in the microcontroller, the security program being executed by the computer when the microcontroller receives flash memory access requests from the connection port;
   wherein when the security program is executed, a pass code stored in the computer is compared with a predetermined code stored in the flash memory device in a form understandable by the security program to enable the microcontroller to prevent data from being exchanged between the connection port and the flash memory when the pass code does not equal the predetermined code and to enable the microcontroller to allow data to be exchanged between the connection port and the flash memory when the pass code equals the predetermined code.

2. The flash memory device of claim 1 wherein the flash memory device is divided into a plurality of partitions and the security program determines how information can be exchanged between the connection port and each partition.

3. The flash memory device of claim 1 wherein the predetermined code is capable of being set by a user.

4. The flash memory device of claim 1 wherein the predetermined code is encrypted.

5. The flash memory device of claim 1 wherein the predetermined code is stored in the microcontroller.

6. The flash memory device of claim 1 wherein the predetermined code is stored in the flash memory.

7. The flash memory device of claim 1 wherein the entire security program is stored in the microcontroller.

8. The flash memory device of claim 1 wherein a remaining portion of the security program is stored in the flash memory.

9. The flash memory device of claim 1 wherein the security program issues commands to a graphical user interface (GUI) of the computer.

10. The flash memory device of claim 1 wherein the connection port is a universal serial bus (USB) port.

11. The flash memory device of claim 1 wherein the connection port is an integrated drive electronics (IDE) port.

12. The flash memory device of claim 1 wherein the security program is written in hypertext markup language (HTML).

13. A method for providing security to a flash memory device, the flash memory device comprising a flash memory, a connection port, a microcontroller coupling the flash memory and the connection port, and a security program, the method comprising:
   pre-installing at least a portion of the security program into the microcontroller;
   executing the security program with a computer to which the connection port is temporality connected;
   accepting a pass code through the security program; and
   comparing the entered pass code with a predetermined pass code.

14. The method of claim 13 further comprising:
   preventing access to the flash memory device if the pass code does not equal the predetermined pass code.

15. The method of claim 13 further comprising:
   allowing access to the flash memory device if the pass code equals the predetermined pass code.

16. The method of claim 13 wherein the security program is written in hypertext markup language (HTML).

17. A method for providing security to a flash memory device, the flash memory device comprising a flash memory, a connection port, and a microcontroller coupling the flash memory and the connection port, the method comprising:
   installing a portion of a security program written in hypertext markup language (HTML) into the microcontroller;
   executing the security program with a computer to which the connection port is temporality connected;
   accepting a pass code through the security program;
   comparing the entered pass code with a predetermined pass code; and
   controlling access to the flash memory device based on the comparison.

18. A secure flash memory device for a computer, the flash memory device comprising:
   a connection port for electrically connecting the flash memory device to the computer;
   a microcontroller electrically connected to the connection port;
   a predetermined code stored in the microcontroller;
   a flash memory electrically connected to the microcontroller; and
   a pre-installed security program for limiting access to the flash memory, the security program being executed by the computer when the microcontroller receives flash memory access requests from the connection port;
   wherein when the security program is executed, a pass code stored in the computer is compared with the predetermined code to enable the microcontroller to prevent data from being exchanged between the connection port and the flash memory when the pass code does not equal the predetermined code and to enable the microcontroller to allow data to be exchanged between the connection port and the flash memory when the pass code equals the predetermined code.

19. The flash memory device of claim 18 wherein the predetermined code is capable of being set by a user.

20. The flash memory device of claim 18 wherein the predetermined code is encrypted.

21. The flash memory device of claim 18 wherein a portion of the security program is stored in the microcontroller.

22. The flash memory device of claim 18 wherein a portion of the security program is stored in the flash memory.

* * * * *